United States Patent
Komp (10) Patent No.: US 8,814,493 B1
(45) Date of Patent: Aug. 26, 2014

(54) AIR-CHANNELED WIND TURBINE FOR LOW-WIND ENVIRONMENTS

(76) Inventor: William Joseph Komp, Louisville, KY (US)

( * ) Notice: Subject to any disclaimer, the term of this patent is extended or adjusted under 35 U.S.C. 154(b) by 515 days.

(21) Appl. No.: 13/175,065

(22) Filed: Jul. 1, 2011

Related U.S. Application Data (60) Provisional application No. 61/361,131, filed on Jul. 2, 2010.

(51) Int. Cl.
*F03D 1/04* (2006.01)

(52) U.S. Cl.
USPC .............................................................. 415/1

(58) Field of Classification Search
USPC .............. 415/220, 221, 222, 144, 145, 182.1, 415/2.1, 3.1, 4.1, 4.3, 4.5, 905, 906, 908
See application file for complete search history.

(56) References Cited

U.S. PATENT DOCUMENTS

| | | | | |
|---|---|---|---|---|
| 1,345,022 A | * | 6/1920 | Oliver | 415/4.3 |
| 1,578,923 A | * | 3/1926 | Schlotter | 415/148 |
| 2,330,907 A | * | 10/1943 | Dodge et al. | 415/185 |
| 3,033,711 A | * | 5/1962 | Harding | 134/7 |
| 3,222,863 A | * | 12/1965 | Klees et al. | 138/43 |
| 4,021,135 A | * | 5/1977 | Pedersen et al. | 415/208.2 |
| 4,070,131 A | | 1/1978 | Yen | |
| 4,075,500 A | * | 2/1978 | Oman et al. | 290/55 |
| 4,132,499 A | * | 1/1979 | Igra | 415/210.1 |
| 4,149,374 A | | 4/1979 | Barchenko | |
| 4,213,736 A | * | 7/1980 | Gongwer | 415/222 |
| 4,324,985 A | * | 4/1982 | Oman | 290/55 |
| 4,369,629 A | * | 1/1983 | Lockwood | 60/698 |
| 4,379,236 A | * | 4/1983 | Inoue | 290/55 |
| 4,397,793 A | | 8/1983 | Stillman et al. | |
| 4,411,588 A | * | 10/1983 | Currah, Jr. | 415/220 |
| 4,415,306 A | | 11/1983 | Cobden | |
| 4,421,452 A | | 12/1983 | Rougemont | |
| 4,422,820 A | * | 12/1983 | Kirsch et al. | 415/4.3 |
| 4,462,213 A | * | 7/1984 | Lewis | 60/641.8 |
| 4,684,316 A | * | 8/1987 | Karlsson | 415/211.1 |
| 4,720,640 A | * | 1/1988 | Anderson et al. | 290/43 |
| 4,781,523 A | * | 11/1988 | Aylor | 415/218.1 |
| 5,599,172 A | * | 2/1997 | McCabe | 417/334 |

(Continued)

FOREIGN PATENT DOCUMENTS

| | | |
|---|---|---|
| WO | 2008/009920 | 1/2008 |
| WO | 2008/017106 | 2/2008 |

(Continued)

*Primary Examiner* — Edward Look
*Assistant Examiner* — Eldon Brockman
(74) *Attorney, Agent, or Firm* — Wyatt, Tarrant & Combs, LLP; William S. Parks (57) ABSTRACT

An inventive wind turbine device including an air intake with a curved interior surface for accelerating wind speed and an optional conical component to direct the captured wind directly to a portion of the turbine housed in the throat of the device. Annular slits are optionally included in the air intake to reduce back pressures of the introduced fluid stream. The device has an exhaust portion with a curved interior surface for discharging the wind. A method of generating electricity regardless of external wind speed by channeling wind into an air intake of the device, passing the wind over the curved interior surface of the intake thereby accelerating the wind speed through the device, reducing the back pressure in the intake by discharging a portion of wind through annular slits therein, and using the accelerated wind to generate electricity is also encompassed herein.

20 Claims, 3 Drawing Sheets

(56) References Cited

U.S. PATENT DOCUMENTS

| | | | |
|---|---|---|---|
| 5,760,515 A * | 6/1998 | Burns | 310/115 |
| 6,382,904 B1 * | 5/2002 | Orlov et al. | 415/4.5 |
| 7,018,166 B2 * | 3/2006 | Gaskell | 415/4.3 |
| 7,147,428 B2 * | 12/2006 | Lamont | 415/1 |
| 7,218,011 B2 * | 5/2007 | Hiel et al. | 290/43 |
| 7,258,523 B2 * | 8/2007 | Williams | 415/2.1 |
| 7,484,363 B2 * | 2/2009 | Reidy et al. | 60/398 |
| 7,874,788 B2 * | 1/2011 | Stothers et al. | 415/4.5 |
| 7,893,553 B1 * | 2/2011 | Calhoon | 290/44 |
| 8,197,178 B1 * | 6/2012 | Chen | 415/4.1 |
| 8,269,368 B2 * | 9/2012 | White | 290/55 |
| 8,310,072 B2 * | 11/2012 | Reitz | 290/44 |
| 8,587,144 B2 * | 11/2013 | Urch | 290/54 |
| 2001/0004439 A1 * | 6/2001 | Bolcich et al. | 416/9 |
| 2003/0137149 A1 * | 7/2003 | Northrup et al. | 290/44 |
| 2003/0156938 A1 * | 8/2003 | Verini | 415/4.2 |
| 2005/0249579 A1 * | 11/2005 | Grubb | 415/4.3 |
| 2007/0241566 A1 * | 10/2007 | Kuehnle | 290/53 |
| 2008/0061559 A1 * | 3/2008 | Hirshberg | 290/55 |
| 2009/0160195 A1 * | 6/2009 | Culjak | 290/55 |
| 2009/0243300 A1 * | 10/2009 | Davis et al. | 290/54 |
| 2009/0280009 A1 * | 11/2009 | Brock | 415/208.2 |
| 2009/0317231 A1 | 12/2009 | Presz, Jr. et al. | |
| 2010/0007148 A1 * | 1/2010 | Davis et al. | 290/54 |
| 2010/0008757 A1 * | 1/2010 | Yen | 415/68 |
| 2010/0086393 A1 * | 4/2010 | Presz, Jr. et al. | 415/1 |
| 2010/0129193 A1 * | 5/2010 | Sherrer | 415/1 |
| 2010/0187828 A1 * | 7/2010 | Reidy et al. | 290/55 |
| 2010/0207389 A1 * | 8/2010 | Nyffenegger | 290/44 |
| 2011/0103955 A1 * | 5/2011 | Desaulniers | 416/183 |
| 2011/0133460 A1 * | 6/2011 | Cucci et al. | 290/44 |
| 2011/0135443 A1 * | 6/2011 | Cucci et al. | 415/1 |
| 2011/0198855 A1 * | 8/2011 | White | 290/55 |
| 2011/0204632 A1 * | 8/2011 | Skala | 290/44 |
| 2012/0001428 A1 * | 1/2012 | Calhoon et al. | 290/44 |
| 2012/0013129 A1 * | 1/2012 | Cornelius et al. | 290/54 |
| 2012/0038157 A1 * | 2/2012 | Skala | 290/44 |
| 2012/0099977 A1 * | 4/2012 | Churchill et al. | 415/185 |
| 2012/0223528 A1 * | 9/2012 | Mena Vergara | 290/55 |
| 2012/0256424 A1 * | 10/2012 | Marin | 290/55 |

FOREIGN PATENT DOCUMENTS

| | | |
|---|---|---|
| WO | 2008/154252 | 12/2008 |
| WO | 2009/239691 | 3/2009 |
| WO | 2009/117620 | 9/2009 |

* cited by examiner

AIR-CHANNELED WIND TURBINE FOR LOW-WIND ENVIRONMENTS

CROSS-REFERENCE TO RELATED APPLICATIONS

This application is a non-provisional of and claims the priority of U.S. Provisional Patent Application Ser. No. 61/361,131 filed Jul. 2, 2010, entitled Air Channeled Wind Turbine for Low Wind Environments, which is hereby incorporated fully by reference.

STATEMENT REGARDING FEDERALLY SPONSORED RESEARCH OR DEVELOPMENT

Not Applicable

REFERENCE TO A "MICROFICHE APPENDIX"

Not applicable

FIELD OF THE INVENTION

An inventive wind turbine configuration including a means for increasing wind speed through the body of the turbine and means for directing the fluid air into a discrete portion of the turbine generator is provided. Such a device allows for the capture of wind from any environment, low speed or otherwise, in order to subsequently efficiently increase the overall wind speed thereof for further introduction within the turbine portion. The overall device thus includes a properly configured air intake component portion with a conical component to direct the captured wind directly to the edge of the turbine as well as suitable means to reduce back pressures of the introduced fluid stream. With the back pressures reduced, particularly through means introduced in an area located within the air intake portion and prior to the turbine portion within the entire device, the user is permitted a manner of effectively generating wind power at an acceptable level, regardless of the lack of appreciably high wind speed environments. Likewise, the inventive device thus permits electrical generation capabilities through wind turbine usage even when the wind presence external to the turbine portion is at a minimal level. A method of providing electrical generation through the utilization of such an inventive wind turbine device is also encompassed herein.

BACKGROUND OF THE INVENTION

Wind power has been harnessed and utilized for centuries to allow for transportation (sailboats, for instance), for food generation (windmills), and, much more recently, as a source of electricity generation (wind turbines). Such a natural resource accords potential unlimited supplies of power generation, of course, without the other drawbacks of the current primary electrical generation methods.

The generation of electricity is of enormous importance in terms of bringing modern luxuries to a large amount of the world's population. However energy generation has proven to be both complex and rather difficult to accomplish from an efficiency and environmental standpoint. Electricity is typically created through the conversion of power sources to electron generation. The general and predominant methods followed for such a purpose include fossil fuel burning (converting heat to electricity), nuclear power (converting fusion of radioactive materials), capturing and storing solar power, hydroelectricity (harnessing water movement to drive turbines), and, of course, wind power (utilizing wind to drive an electricity-producing turbine).

Fossil fuels are currently utilized within most electrical power generating systems in the world due to the large supply of coal and other such fuels that can easily burn to generate the needed heat for such a purpose. Unfortunately, this method is well-known to cause the emission of undesirable gases into the atmosphere (carbon dioxide, sulfur dioxide, for instance). As well, however, coal also may include certain heavy metals (mercury, chromium, and the like) that, upon incineration of the coal itself, may be released into the atmosphere as well unless removal means are implemented for such a purpose. Basically, though, this electricity generating method is problematic, particularly in the future with the expected growth in worldwide populations demanding greater amounts of power, thereby theoretically, at least, increasing the expected amount of burning fuels and subsequently polluting emissions as a result.

Nuclear power is considered a potentially "cleaner" alternative to fossil fuels because nuclear power generation does not generate the undesirable gas emissions that coal fired and other fossil fuels plants produce; however, the necessity for radioactive materials, both in supply and eventual destruction or long-term storage, has created considerable resistance to such programs.

Solar power has proven rather difficult to implement, particularly on a large-scale level. The complexities involved with capturing and storing such power allows for small-scale, individual, methods of this sort, but large-scale implementation has proven elusive. Furthermore, the storage necessity is of utmost importance considering the lack of constant reliability of a solar power source. To provide a sufficient amount of power through constant variations in solar exposure is rather difficult, in other words.

Hydroelectricity has been possible upon the creation of dams over certain moving water sources. The directional flow of fluids through a turbine creates the necessary rotational movement thereof to generate electricity as a result. Although such a large-scale procedure has been workable in many areas of the globe, the ability to locate and implement such a system without simultaneously impacting the surrounding environment (though, for example, the redirection of water sources) has, in many cases, been a problem. Flooding, although alleviated in some situations through dam erection, at times is exacerbated through such a method. Likewise, dam building has also proven to reduce the available water to some areas, thus providing an unwanted tradeoff of water for electrical power. In general, hydroelectricity is reliant primarily on finding a suitable riparian source and handling the overall situation properly; the numbers of effective electrical generating sources provided in this manner has been minimal at best, as a result. The difficulty in locating and suitably utilizing sufficient sources of moving water in the future for such a purpose also militates against long-term plans of hydroelectric solutions for power generation.

Wind power, on the other hand, can theoretically be available anywhere on the planet. Through differing pressures within the atmosphere, wind can be generated at any speed and, much like hydroelectricity, may be channeled through a turbine to provide the necessary rotational energy to create electrical charges. The main problems affecting such a system lie in the locating and sustaining at least minimal wind speeds to generate minimal electrical charges, as well as the possibility of very high winds above a certain threshold that could damage the machinery involved. Particularly with large bladed devices, if wind speeds exceed a certain level, shutdown is generally required to protect the expensive machines.

Large blades are generally utilized in order to generate the greatest amount of turbine activity in relation to the typical wind speeds available in a certain area. In other words, since wind speeds are very hard to predict, large blade devices are utilized quite often in order to compensate for potentially low levels to generate the greatest amount of fluid stream through the subject turbine. As noted above, however, this structural configuration may actually become highly problematic as very high wind speeds may damage the turbine through excessive rotational movement not to mention the possibility of large blade damage through high wind shear exposure. Additionally, due to the utilization of large blades, these devices are often very large. Wind turbines can be installed in a group which is sometimes referred to as a wind farm. Thus, the installation takes up a considerable amount of space.

As alluded to above, wind turbines have been utilized for various uses in the past, although their importance for electricity generation has only recently been of note. Wind turbines usually contain a propeller-like device, termed the "rotor", which is faced into a moving air stream. As the air hits the rotor, the air produces a force on the rotor in such a manner as to cause the rotor to rotate about its center. The rotor is connected to either an electricity generator or mechanical device through linkages such as gears, belts, chains or other means. Such turbines are used for generating electricity and powering batteries. They are also used to drive rotating pumps and/or moving machine parts. It is very common to find wind turbines in large electricity generating "wind farms" containing multiple such turbines in a geometric pattern designed to allow maximum power extraction with minimal impact of each such turbine on one another and/or the surrounding environment.

Although such devices provide effective means for this purpose, drawbacks have created limited usage in the past. For example, the reliability of such devices to provide effective electricity generation in variable wind speed environments has been problematic. Although some locations around the globe are known to harbor high wind speed environments on a reliable basis (mainly over bodies of water), the ability to utilize less open expanses for wind farms for this purpose has proven difficult to increase wind turbine usage worldwide. In other words, the lack of localities with reliable, sustainable wind levels, coupled with the difficulties in storage and transfer of electricity from such locations that do exhibit such favorable characteristics, has been a difficult threshold issue to overcome in expanding wind power generation. More urban locations are generally frowned upon due to the presence of obstacles to open wind areas (for instance, buildings, trees, and other obstructions) and thus do not typically allow for suitable laminar air flow possibilities for wind farms to be worthwhile under current technological levels. An ability to provide effective low wind areas with reliable wind power generating devices has heretofore been difficult to accomplish, as noted above.

The basic problem with low wind areas lies in the necessity of creating suitable and appreciable rotational movement of the subject turbine at a rate that generates the needed minimal electrical charge on a continuous basis. Turbines of this sort include a plurality of blades that create the necessary rotational energy upon exposure to an air stream passing therethrough. As such, proper rotational movement of the turbine relies specifically upon the wind speed present within the throat of the air intake; the higher the speed, the greater the possible rotation of the turbine, and, consequently, the greater the level of electrical generation. Low wind areas thus create distinct problems for wind turbines as the need to increase throat speed relies primarily on the environmental conditions for overall effectiveness.

Some developments have been made in order to attempt to provide artificial increases in throat speed in the past. Notably, however, every past attempt relied upon modifications of the turbine exhaust system. One significant development proposed generating a vortex that creates a vacuum to possibly create increased air pressures and thus greater air movement through the turbine itself. Unfortunately, a number of drawbacks exist with such a system. For instance, by relying upon the exhaust system to initiate the vacuum generation, such a system requires an initial wind speed generation to effectuate the actual vacuum subsequent to air intake utilization. In other words, in order for this system to function, it appears that low wind systems would still create a lack of sufficient air stream speed to create the necessary vacuum in the first place. Secondly, such a system does not take into account the potential for efficiency reductions due to even distributions of air streams on the turbine blade surfaces. With an even level of air stream introduction onto all turbine surfaces, and through the presence and utilization of an evenly generated and applied vacuum thereafter, the turbine itself may not perform to the level it was designed. Lastly, there is no compensation within this prior device to permit reductions in air speed through the subject turbine should the wind speed as introduced grow too high. With the static design, in the exhaust the vacuum generation would continue indefinitely, apparently, without concern as to the degree of strain on the turbine should the air stream velocity increase to a maximum level.

Thus, there exists a need to harness the very clean wind power natural resource to a degree that low wind speeds may still generate effective electrical generation while simultaneously permitting a manner of controlling the velocity of air streams through the subject turbine during high wind events in order to reduce the propensity of turbine damage in such situations. To date, reliable technologies to overcome such drawbacks have been unavailable to the industry.

ADVANTAGES AND BRIEF DESCRIPTION OF THE INVENTION

An advantage of the inventive wind turbine of the present invention is the ability to provide effective and reliable electricity generation at very low wind speed levels. Another advantage of the present invention is the ability to maximize the subject turbine's efficiency through controlled fluid stream direction to a specific location on the turbine during operation. Yet another advantage of the inventive device is the ability to reduce any back pressure created in the turbine intake due to the narrowing of the intake channel and throat containing the turbine without the need for vacuum suction possibilities but through the utilization of pressure reduction means within the air intake component as well as possible other means present within the air intake portion as well.

Another advantage of the wind turbine of the present invention is the scalability of its design. The inventive device can be tailored to be many sizes and to fit in many different locations provided that the overall shape, curvature, and proportion of the device meet the criteria described within. In addition to the typical locations for large scale wind power generation, other potential locations for the inventive device include the attics of single family homes, the roofs of buildings, the underside of interstate overpasses, and mountain tops.

Yet another advantage of an embodiment of the present invention which utilizes a modular design is ease of maintenance and reduced downtime.

In accordance with such advantages, this invention thus encompasses a wind turbine configuration including an air intake portion, a throat portion, housing including a turbine portion, and an exhaust portion, wherein said air intake portion exhibits a curve design in axial-symmetric fashion, wherein said exhaust portion exhibits a similarly curved design in axial-symmetric fashion, wherein said air intake portion exhibits a volume and size greater than that exhibited by said exhaust portion, wherein said throat portion exhibits a volume and size smaller than for said exhaust portion, and wherein said air intake includes a plurality of consecutive annular slits within the walls thereof. Alternatively, the invention may be understood to encompass a wind power generating device including an air intake portion, a throat portion, housing including a turbine portion, and an exhaust portion, wherein said device exhibits an air speed increase as measured as the comparison between the air speed prior to movement through said air intake portion and the air speed prior to movement through said turbine portion and subsequent to movement through said throat portion, wherein said device does not include any generation of a vacuum or a vortex therein during operation. A method of providing electrical generation through the utilization of such an inventive wind turbine device is also encompassed herein.

Thus, the invention provides an inventive wind turbine configuration including a means for increasing wind speed through the body of the turbine and means for directing the fluid air into a discrete portion of the turbine generator. Such a device allows for the capture of wind from any environment, low speed or otherwise, in order to subsequently efficiently increase the overall wind speed thereof for further introduction within the turbine portion. The overall device thus includes a properly configured air intake component portion with a conical component to direct the captured wind directly to the edge of the turbine as well as suitable means to reduce back pressures of the introduced fluid stream. With the back pressures reduced, particularly through means introduced in an area located within the air intake portion and prior to the turbine portion within the entire device, the user is permitted a manner of effectively generating wind power at an acceptable level, regardless of the lack of appreciably high wind speed environments. Likewise, the inventive device thus permits electrical generation capabilities through wind turbine usage even when the wind presence external to the turbine portion is at a minimal level.

The following standards table (Table 1) provides the accepted classifications of wind power density for specific Wind Class Environments for electricity generation with wind turbine devices.

TABLE 1

STANDARDS TABLE

| Wind Power Class | Wind Power Density (W/m$^2$) | Speed m/s (mph) | Wind Power Density (W/m$^2$) | Speed m/s (mph) |
|---|---|---|---|---|
| 1 | <100 | <4.4 (9.8) | <200 | <5.6 (12.5) |
| 2 | 100-150 | 4.4 (9.8)/ 5.1 (11.5) | 200-300 | 5.6 (12.5)/ 6.4 (14.3) |
| 3 | 150-200 | 5.1 (11.5)/ 5.6 (12.5) | 300-400 | 6.4 (14.3)/ 7.0 (15.7) |
| 4 | 200-250 | 5.6 (12.5)/ 6.0 (13.4) | 400-500 | 7.0 (15.7)/ 7.5 (16.8) |
| 5 | 250-300 | 6.0 (13.4)/ 6.4 (14.3) | 500-600 | 7.5 (16.8)/ 8.0 (17.9) |
| 6 | 300-400 | 6.4 (14.3)/ 7.0 (15.7) | 600-800 | 8.0 (17.9)/ 8.8 (19.7) |
| 7 | >400 | >7.0 (15.7) | >800 | >8.8 (19.7) |

The ability to utilize a wind turbine device located in a certain Wind Class Environment (such as a Class 1 location) and generate power density at a higher Class rating (such as Class 3, as one example), is thus a long understood need within the wind turbine industry.

The inventive device of the present invention creates a much improved and more reliable alternative for energy generation using wind power, particularly for utilization in low wind areas, but also in terms of allowing for compensation within the turbine portion for air speed reductions as well should the wind speed level exceed safe measurements. Rather than relying upon any exhaust modifications for air speed increases, the inventive device includes a modification of the air intake portion itself to effectuate the desired air speed controls through the turbine portion. The air intake, as noted in greater detail below, is redesigned to form a curved chamber (as defined by a quadratic, hyperbolic, or exponential equation) with a specific intake curve to maximize the average throat speed of wind transferred therethrough prior to entry within the turbine portion. In this manner, the outer peripheral edge of the air intake component will exhibit the maximum diameter of not only the entire air intake component, but also the greatest diameter of all the components of the overall device (exhaust component included). The curve of the air intake should, in one preferred embodiment, gradually decrease in size until the throat portion of the device is reached. The throat portion may provide a static diameter measurement if desired, although further reductions in size may be present if desired. Preferably, though, the throat, including the throat housing in which the turbine and dynamo/alternator parts will be present, will exhibit, as noted, a static diameter sufficiently large enough to house the turbine, etc., without any impediment to rotational movement of such parts as well as to prevent any appreciable movement of air fluid streams through to the exhaust component without passing through the turbine blades (in essence, to best guarantee highest efficiency of wind speed usage). The throat housing then leads to the exhaust portion that exhibits a similar curve equation (again, quadratic, hyperbolic, or exponential in type) as that for the air intake; however, the resultant measurements will be scaled down by a certain ratio such that the overall design of the wind turbine device will not be symmetrical in size from the air intake side to the exhaust portion side. In this manner, the ingress of wind into the air intake will be of a greater volume potential, the throat portion will generate, as with Bernoulli's principle, faster air speed through the constriction of air volume therethrough, and the exhaust portion will allow for proper dissipation of the wind subsequent to passing through the turbine.

Alternatively, or additionally, as both are possible potential embodiments of the overall invention, however, is the presence of a plurality of annular slits in consecutive relation to one another on either side of the air intake chamber axis. Such slits may be either fixed in terms of their size, shape, and location, or may be adjustable in any way. The ability to provide effective back pressure relief through these slits imparts the potential throat speed increases into the turbine portion. Such slits may be of any size and shape, basically, as long as two or more (preferably, at least three) that are configured concentrically within the air intake component. The presence of these slits provide, unexpectedly, the necessary and advantageous wind speed increase through the through portion of the overall device. A gain of over 30% of the wind speed in the throat as compared to the intake inlet versus wind speed measurements in the throat without any slits but with the same air intake configuration has been realized; an increase that has heretofore been unavailable without exhaust modifications. Thus, the invention may encompass the sole inclusion of such a plurality of consecutive annular slits within an air intake portion of a wind turbine device to provide the wind speed increase, rather than also requiring the proper curved designs of the individual components parts as noted above.

Another potentially preferred embodiment of the invention, as alluded to above, involves the critical selection of a properly sized throat portion within the overall device in relation to the air intake diameter, as well as a properly sized exhaust portion in like manner. The overall ratio of maximum diameter of air intake to throat ranges from about 2.5 to 1 to about 4 to 1, the ratio of intake to exhaust (in maximum diameter) is roughly about 1.4 to about 1, and the ratio of exhaust to throat (in maximum diameter) is about 2.3 to about 1. Thus, utilizing the same curve equation for the air intake and exhaust will provide flared horn shaped structures for both components, with the maximum diameter for each component providing the starting point in terms of the curve designs followed. Although the exhaust and air intake may have the same maximum diameter, as noted above, preferably the air intake will be larger in terms of this measurement.

Alternatively, however, the curve equation followed for the air intake and the exhaust portions may be different as long as the ultimate design accords a greater volume for the air intake than for the exhaust portion. In such a situation, as well, the maximum diameter for the air intake portion should be larger than that for the exhaust portion. Being both symmetrical around an axis (and thus providing, by definition, particularly with a diameter measurement being the standard, a circular outer peripheral edge for each portion), as noted above, with a curve design in place, the ultimate configuration for each portion will preferably be a flared horn shape.

Basically, then, the throat (preferably being substantially cylindrical in shape) exhibits a much smaller volume than that for the air intake, thereby, in conjunction with or without the above-noted consecutive slits (preferably with), imparting a much smaller area into which the directed airflow moves through the device. The exhaust portion, subsequent to the turbine and the mechanically connected electrical generator should also exhibit a certain configuration in relation to the throat, albeit in a different manner than for the air intake. Specifically, the rate of area decrease between the air intake and the throat is much larger than the rate of increase between the throat and the exhaust (preferably). The curve, as described above, exhibited by the air intake/throat configuration, in other words, is of greater change than the curve exhibited by the throat/exhaust configuration (again, with the turbine, etc., therebetween). Such a design, coupled with the design of the air intake in its curved formation, as well as the presence of the consecutive slits, as noted above, thus allows for the generation of the aforementioned air stream velocity increase through the turbine from that present environmentally prior to introduction within the air intake portion itself.

In rough measurements, the velocity through the throat and thus through the turbine could be increased by at least a factor of between about two (2) and about two and one half (2.5), surprisingly, in such a configuration.

As a further possible modification, and in order to generate greater efficiency of the turbine in terms of electricity generation, the air intake (and thus the throat) may also include a conical director to deflect air stream to a specific location on the turbine blade surface. Such a director may thus allow for controlled capabilities of air stream introduction for faster and more reliable turbine rotational movement over time. In essence, typical turbine designs rely upon even distributions of wind speed over the entirety of the turbine blades during operation. Although this appears to be an effective manner of providing such electrical generation, the possibility exists that air traveling over the entirety of the turbine blades may actually cause resistance to movement rather than increased unabated movement. The potential for overcoming possible resistance through directed air streams to one area thus can actually increase the turbine movement and increase the potential efficiency of the overall device.

Additionally, the aforementioned annular slits may provide other benefits, whether adjustable or fixed in nature, that may further improve the efficiency and/or lifetime usability of the overall device. For instance, the air that will escape through such slits during typical operation may be forced outside of the air intake and into contact with the electrical generator portion connected to the turbine portion. In this manner, such forced air may actually cool the electrical generator during use thereby reducing the potential for overheating over time, and extending the lifetime capability of such a component. Furthermore, such slits may, if adjustable, be closed (fully or partially) on demand to possibly increase back pressure through the throat in order to actually reduce the air stream speed therethrough. In such an instance, particularly if the environmental wind speed is at a very high level at that moment, such an adjustable capacity may protect the turbine from excessive movement, thereby, as above, extending the lifetime use of such a potentially expensive component. As well, such adjustable slits may also protect the other components of the overall device from shearing apart due to excessive wind speeds during operation. Thus, if desired, the adjustable slits may not only increase wind speed, but reduce them as well. The adjustability may be undertaken manually or, preferably, electronically through a remote controlling device. Most preferred, is control through a computer that is configured to sense any wind speed changes to threshold levels for such a necessity.

Further modifications that may be followed include the introduction of a long narrow spike into the middle of the air intake chamber. Such a spike may accord further back pressure reductions in addition to the required annular slits present therein the chamber simultaneously. Turbulence modifiers may also be present in front of the air intake as desired to effectuate reduction in air speed initially or to direct the air to a certain location therein. Thus, small obstructions may be erected exterior to the air intake at selected locations for this purpose.

The actual turbine component may be of any standard type in relation to wind power generators. Conventional blade types as well as elliptical Savonius type wind turbines are potentially preferred for this purpose, mainly due to their prevalence in the industry, their ability to function well at variable wind speeds as well as fitting the geometry of the throat.

The overall design of the device, described in greater detail below, basically includes the curved chamber of the air intake, being significantly larger in size and volume than the air exhaust chamber present on the opposite side of the entire device, but with a similarly, though, ultimately, smaller, curve structure exhibited therein. Between these two chambers lies a throat portion that is a symmetric tube connecting the air intake with the turbine component. The turbine component is actually present with a protective housing (which also includes the electrical generator portion located just prior to the exhaust portion) in order to shield the moving components from other environmental conditions (such as rain and snow). The turbine itself may, as noted above, be of any type, whereas the electrical generator is a typical electrical generator that allows for the conversion of the mechanical energy generated by the rotation of the turbine blades into electrical charges.

The overall structure should be produced from suitable resilient and weatherproofed materials to withstand high winds, strong rains, and overall harsh conditions for a significant period of time on a continuous basis. Metal materials (such as stainless steel, etc.) as well as carbon composites are preferred for this purpose, with the turbine and electrical generator portions certainly requiring metal constituents for proper utility. Some polymeric materials, includes polyaramids, for instance, may be utilized as the constituents of the remaining structures if desired, as well as carbon fiber composites, polyethylene composites, polypropylene composites, and any other resilient composite structure. For lighter materials, as well, certain components may include low density polymer cores (polystyrene, for instance) without compromising the overall strength and effectiveness of the device in terms of withstanding higher fluid stream speeds and thus in terms of electricity generation. For mass production purposes, injection molding with above-listed plastic components may be particularly preferred.

Furthermore, the individual components of the overall device may be produced in modular structure form to facilitate transport and construction at remote locations (if necessary) as well as ease in repair through replacement of such individual parts if any component is damaged to such an extent. The components may thus be attached to one another through snap-in constructions, fastening means (for instance, screws, bolts, and the like), or through screw-in designs as well. Proper adhesives for securing connected joints for stronger attachment, as well as for the sealing of any openings between the individual components, may be utilized as well. Polytetrafluoroethane tape would be one possible non-limiting example.

In normal operation, the wind turbine faces fully into the wind. However, in conditions where the wind speed is increasing, a wind speed will be reached above which it will be necessary to tilt the wind turbine progressively out of the wind. If the wind speed continues to increase the wind turbine will eventually reach the parked position where the airflow ceases to pass through the housing to provide power. Such movement may be made manually or, as above, through remote controls. Again, however, computer control of the direction of the device in relation to the wind itself is preferred. Typically, the device will be situated on an hydraulic arm that may be maneuvered as needed for maximum wind speed exposure. Potentially preferred would be the utilization of a transducer present in a heuristics loop coupled to a servo to keep the device incident upon the wind (with a controller, such as a micro-controller) allowing remote control in such a manner.

The various functions of the device are monitored by the computer and can be reviewed by a controller on the ground. At any time, the controller can instruct the computer to shut down the device by moving the wind turbine into the parked position. Advantageously, the device has failsafe means for moving the wind turbine to the parked position in the event of a system failure. Thus, independently of an instruction from a ground controller, the device will shut down in the event of a malfunction in one of the systems.

Although such a device may be integrated directly into a large-scale electrical system, alternatively, such a device may be combined with a battery storage system as well to provide emergency backup power should an electrical grid fail. In any event, the device may be utilized for either residential (individually or large-scale) use or industrial use (individually or large-scale).

DETAILED DESCRIPTION OF THE DRAWINGS AND PREFERRED EMBODIMENTS

Figure 1:
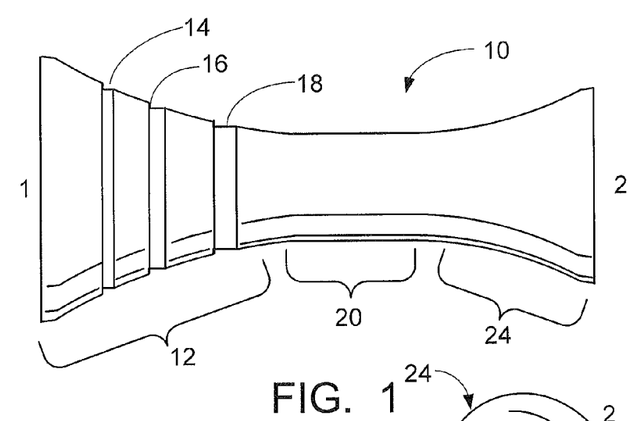
FIG. 1 is an external side view of one embodiment of the wind turbine device of the present invention.
Figure 7:
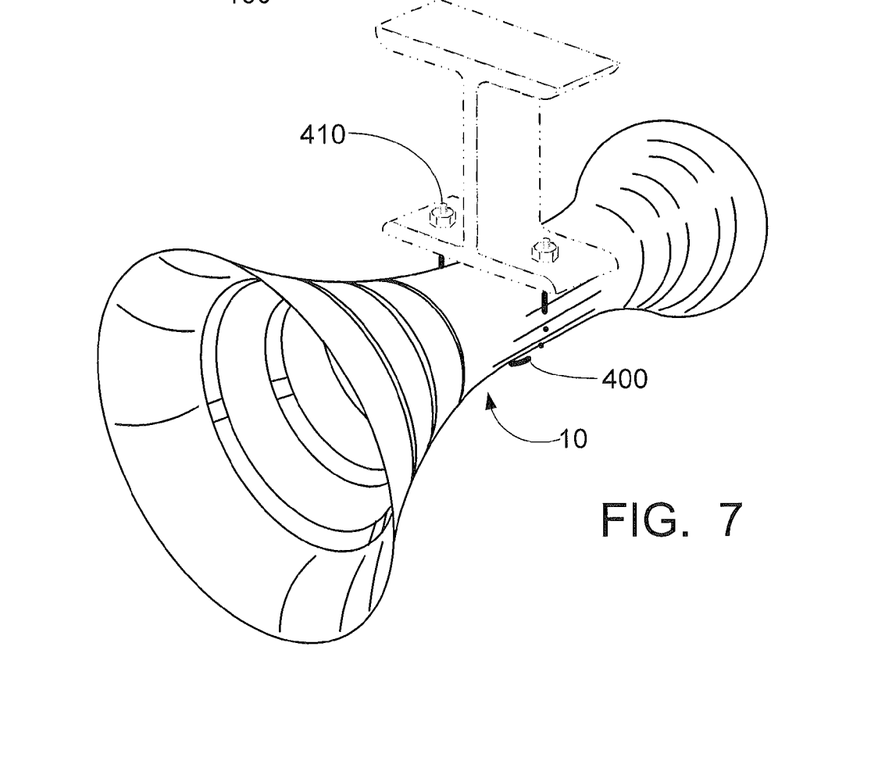
FIG. 7 is an example of an installation of one embodiment of the wind turbine device of the present invention wherein the device is installed on a support beam.

The invention will be further illustrated by the following description of embodiments thereof, given by way of example only with reference to the accompanying drawings in which:

FIG. 1 illustrates a side view of one embodiment of the overall wind turbine device 10. Such a device 10 may be situated atop a post or pole (not illustrated) if desired to access higher altitudes and thus potentially to facilitate wind exposure. Alternatively, such a device 10 may be placed on a building roof (not illustrated) or like structure to permit wind exposure in a like fashion. As yet another example, the device 10 can be installed under a bridge to permit wind exposure. As shown in FIG. 7 by way of example, the device 10 can be secured to a support beam of a structure such as a those mentioned above with a u-bolt 400 and nuts 410 or other fasteners. The important concept being the proper access of the electrical generator (such as 80 in FIGS. 3 and/or 4) to an electrical transfer or storage device (neither illustrated) wherever situated.

Thus, the structure provided in FIG. 1 (as well as FIGS. 2, 3, 4 and 7) shows a horn or bell-shaped air intake 12 including a series of similarly configured and sized slits 14, 16, 18 therein. The intake 12 has a curved interior surface 3. In one embodiment, the curved configuration of the interior surface 3 of this potentially preferred air intake 12 complies with a general hyperbolic equation of $[0.43(1-\exp(-0.07-2.58*(x)))]$ where x is the linear distance along the central axis of the entire device 10 from the air intake inlet 1 to the exhaust outlet 2. The slits 14, 16, 18 permit back pressure reductions upon the introduction of high wind speed streams into the air intake 12, allowing for a resultant fast-moving column of air in the center of the air intake 12 incident on the narrow diameter of the throat 20 alone.

Figures 2, 3:
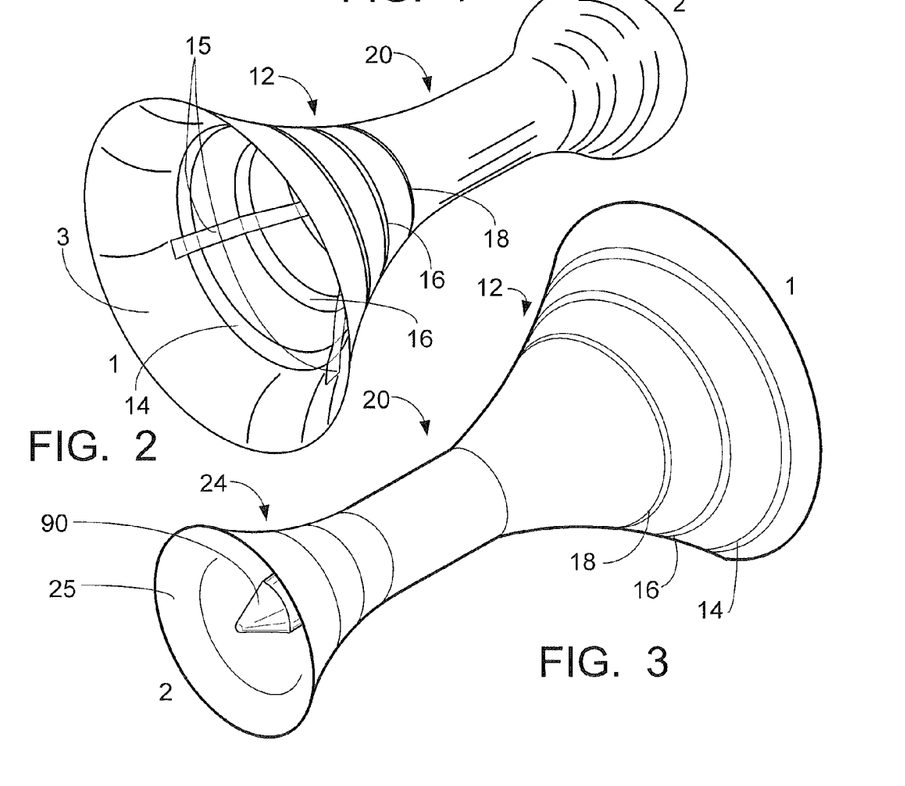
FIG. 2 is a perspective view of the exterior of one embodiment of the wind turbine device of the present invention, showing the air intake end of the device.
FIG. 3 is a perspective view of the exterior of one embodiment of the wind turbine device of the present invention, showing the exhaust end of the device.
Figure 4:
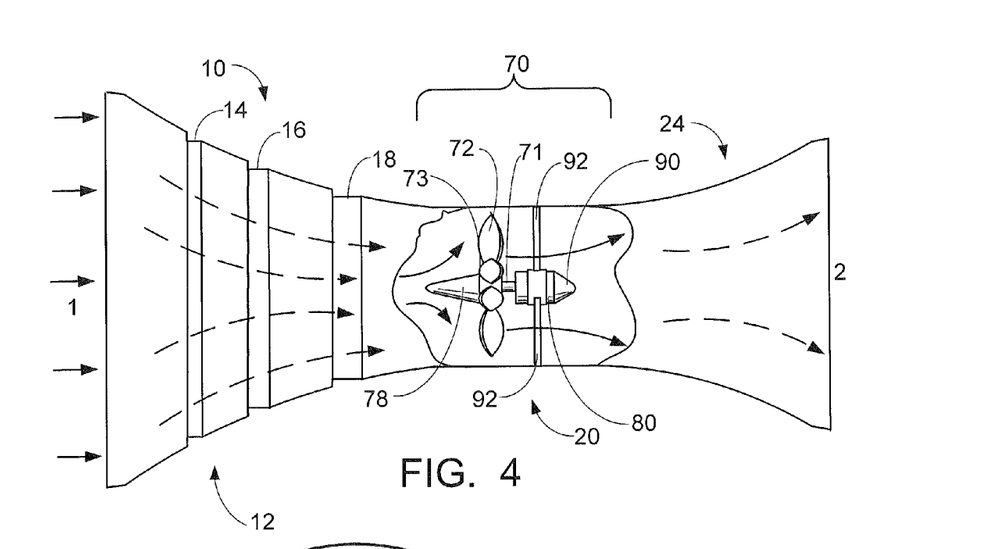
FIG. 4 is a side view of one embodiment of the wind turbine device of the present invention including a cut out portion of the throat showing the turbine.

Still referring to FIGS. 1 and 2, the air intake 12, then leads to a throat 20 which includes a housing 22 in which a turbine (70 of FIGS. 3 and/or 4) including a plurality of blades (72 of FIG. 4) is present and in contact with an electrical generator 80 (See FIG. 4). The electrical generator 80 can be any device for converting rotational mechanical energy into electrical energy for example a dynamo (for direct current production) or an alternator (for alternating current production). The throat 20 itself is of significantly reduced volume and diameter as compared to the air intake 12, thereby conferring to the turbine (70 of FIGS. 3 and/or 4) a similarly small diameter in order to permit proper placement and function within the throat housing 22.

Thereafter is provided an exhaust portion 24 exhibiting a similar horn or bell shape to the air intake 12, but having a smaller diameter than the air intake 12 at its largest measurement, but a greater diameter and volume than that exhibited by the throat 20. The exhaust 24 has a curved interior surface 25. In one embodiment, the curved interior surface 25 is defined structure wise by a quadratic curve equation of $1.075*x^2 - 0.115x + 0.257$. This similarly shaped exhaust portion 24 is preferably formed in relation to a different curve equation as for the air intake, although, in other potentially preferred embodiments, the curve equations may be the same, albeit, in smaller dimensions for preferably a larger air intake in terms of volume. Both the air intake 12 and the exhaust portion 24 preferably exhibit symmetrical shapes around an axis, as a result of their curved designs. With a range of possible overall lengths for the device (such as from about 0.5 meters to about 5.0 meters, only as an example, the more important consideration is the scalability of the overall device in terms of a ratio of measurements in terms of diameters between the three main portions noted above), any size device may be utilized. Table 2 is provided below to correlate the curved dimensions of the air intake 12 and the exhaust portion 24 in terms of diameter measurements along the curves for one example embodiment of the wind turbine device 10 of the present invention.

Such an overall structure thus imparts the capability of taking in wind within the air intake 12 and, through the presence of the slits 14, 16, 18 therein, reducing any back pressure as needed to a level that permits the incoming wind to move through to the throat 20 at a wind speed elevated from that measured external to the air intake 12. The slits 14, 16, 18, configured preferably in concentric relation to one another and including coupling portions 15 (FIG. 2) evenly distributed to act both as separators for slit formation, as well as connecting points within the overall structure of the air intake 12 to hold the overall component dimensionally stable during utilization. The relative size range of such slits 14, 16, 18 are from 1 cm to 8 cm in width, with an arclength around the curved periphery of the air intake 12 measured as a percentage of the overall circumference of the circular configuration in those specific locations of from 30 to 95%.

In one example embodiment, the specific slits are spaced as follows: the first slit 14, is located about 168 centimeters from the intake inlet 1 of the air intake 12; the second slit 16 is located about 300 centimeters from the same starting point on the air intake 12; the third slit is located about 490 centimeters in like fashion. Also, the annular slits 14, 16, 18 are graduated in terms of slit width within this potentially preferred, non-limiting embodiment such that the first slit 14 has a width of about 32 centimeters, the second slit 16 of about 43 centimeters, and the third slit 18 of about 64 centimeters. As noted, the slits 14, 16, 18 are basically cut-out portions in the air intake 12 and include remaining coupling portions 15 within the air intake 12 to hold the intake 12 in one piece even with such cut-out slits 14, 16, 18 present. The coupling portion 15 associated with the first slit 14 in the example above is approximately 3.5 cm wide, the coupling portion 15 associated with the second slit 16 in the example above is approximately 4.5 cm wide, and the coupling portion 15 associated with the third slit 18 in the example above is approximately 6.5 cm wide. There may be one or more coupling portions 15 within the air intake 12 and about the circumference of the air intake 12 as needed to support the air intake 12.

Figure 6:
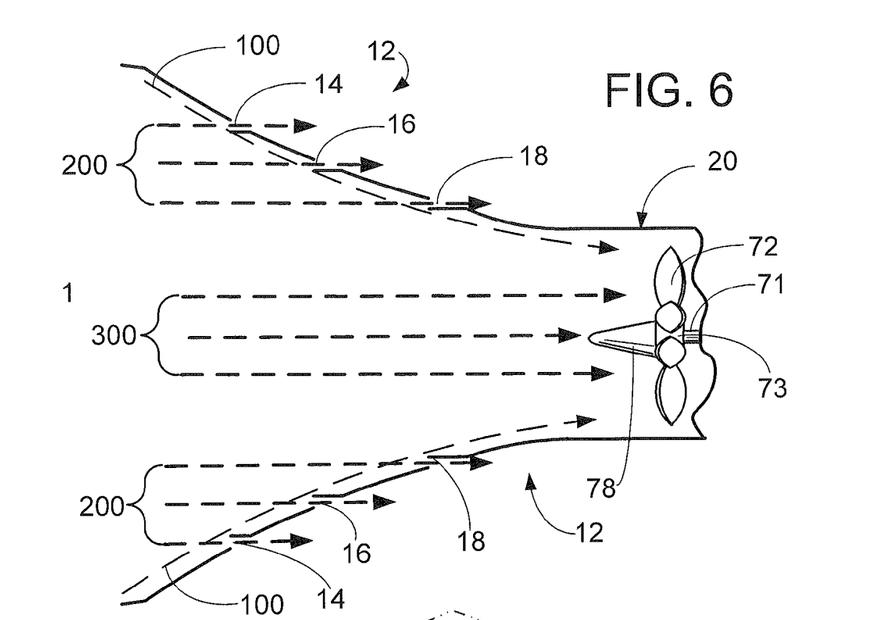
FIG. 6 illustrates the different regions of air flow created in the air intake portion of the wind turbine device of the present invention.

As shown in FIG. 6, the plurality of slits 14, 16, 18 are positioned such that each slit opening is parallel to the air flow direction thereby allowing some of the air to pass through the intake 12 and exit along its natural path at the plurality of slits 14, 16, 18 thus reducing the amount of backpressure created in the intake 12. In one embodiment (again, any configuration of slits may be present to provide the needed back pressure reductions, these annular slits are simply preferred types), such slits impart a predicted gain in air speed as measured in the throat of a quadratic form ($0.044v^2 + 2.453v$, wherein v is the ambient air speed as measured at the air intake inlet). Thus, with an ambient air speed of 2 m/s (4.5 mph), the speed can increase to 5.3 m/s (11 mph), as one example, by any measure a significant increase, particularly in terms of providing such a result through modifications in the air intake in this manner, and without any need for generation of a vortex or vacuum via a design modification within the exhaust portion 24 of the device 10.

Figure 5:
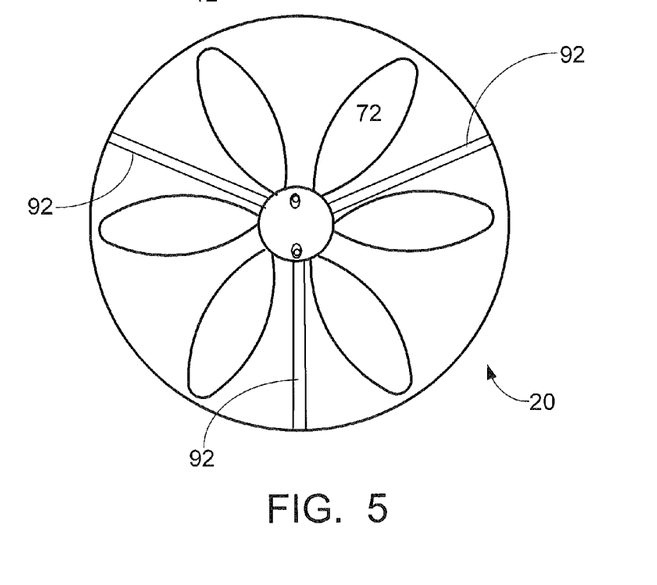
FIG. 5 is a cross sectional view of one embodiment of the wind turbine device of the present invention showing the throat from the air intake end of the device including the turbine.

Such slits 14, 16, 18 (See FIGS. 1, 2, and 4) provide, as noted previously, the unexpectedly effective benefit of reducing back pressures while simultaneously according the ability to increase the throat speed of the incoming wind by about two (2) to two and one half (2.5) in this configuration. Referring now to FIGS. 4 and 5, in such a manner, the turbine 70 located in the throat 20 is exposed to such an increased wind speed so as to rotate due to the pressures applied to the plurality of blades (72 of FIGS. 4 and 5) present thereon which, in turn, allows for the electrical generator (80 in FIG. 4) to generate electrical charges for usage or storage. Once the wind passes through the throat 20 and housing 22 and turbine (70 of FIGS. 4 and/or 5), the wind is then passed and dispersed through the exhaust portion 24. The hyperbolic shape of the exhaust portion 24 (FIG. 3) in relation to the shape of the air intake 12 thus allows for further wind speed increase through the wind turbine device 10 by releasing any extra back pressure through the larger volume area therein as compared with the volume exhibited by the throat 20. In essence, Bernoulli's principle in terms of fluid streams applies with regard to the ability to increase fluid pressure upon reduction in volume through a narrower space, but in modified form through the inclusion of further back pressure alleviators, the slits 14, 16, 18, present within the air intake 12 prior to the turbine (70 of FIGS. 4 and/or 5).

Thus, a device that allows for the generation of an increase in wind speed solely within the area of the device prior to the turbine portion 70 is provided. As noted above, there have been no similar devices provided within the pertinent art that concerns a front-loaded wind speed increase capability within a wind turbine arrangement. To the contrary, the other devices that concern themselves with altering the wind speed through a turbine to any extent rely solely upon modifications to the exhaust portion thereof and the capability of generating a vortex (vacuum) to draw wind and air through the overall structure at a quicker pace than that measured external to the overall device. As noted above, again, and as well, such a design requires the initial generation of the proper wind speed to effectuate the vortex creation in order for the overall structure to function as needed. Quite opposite to such a structure, then, is that provided currently wherein the carefully designed slits and hyperbolic structures of the individual device components impart the initial wind speed increase without any initial vacuum or other exhaust-created phenomenon.

Referring now to FIGS. 4 and 5, the turbine 70 is positioned within and axially aligned with the throat 20. The turbine 70 has a central hub 73 axially aligned with the throat 20 which is freely rotatable about the axis. A plurality of blades 72 are affixed to the hub 73 and extend radially therefrom. A first end of a shaft 71 is affixed to the hub 73 and axially aligned with the hub 73 and throat 20 such that the shaft 71 rotates when the turbine 70 rotates. The shaft 71 is mechanically and rotationally connected to the electrical generator 80 such that when the turbine 70 rotates mechanical energy generated by the rotation is transferred to the electrical generator 80 and converted to electricity. In some embodiments, a gear box (not shown) is included intermediate to the shaft 71 and electrical generator 80 for increasing the rotational speed of the shaft 71 for use by the electrical generator 80. In one embodiment, the electrical generator 80 is mounted internal to the device 10 behind the turbine hub 73 in line with the shaft 71 (FIG. 4). In another embodiment, the electrical generator 80 is mounted external to the wind turbine device 10 (not shown).

Optionally, and provided in FIGS. 4 and 5 is a cone 78 may be situated on the turbine hub 73 (FIG. 4) and centered within the throat 20. Such a cone 78 accords further back pressure reduction capabilities. Additionally, this cone (78 of FIGS. 4 and/or 5) is configured to direct the incoming wind to the outer regions of the turbine (70 of FIGS. 4 and/or 5) thus allowing for a more even distribution of pressures along the blades (72 of FIGS. 4 and/or 5) of the turbine (70 of FIGS. 4 and/or 5). By directing the incoming wind to specific regions of the turbine blades and away from the turbine hub 73, greater torque is applied to the turbine blades 72. In other words, although not a required limitation of the present inventive device, the cone (78 of FIGS. 3 and/or 4) imparts the capability of further increasing wind speed possibilities and/or making the turbine more efficient due to causing fluid streams to contact the turbine blades (72 of FIG. 4) in more specific areas, rather than all at once and in total over the entire turbine itself. Such a cone component (78 of FIG. 4) may have a base of any maximum diameter as long as the base diameter is less than the diameter of the throat in order to allow for the diverted air to contact the turbine blades (72 of FIG. 4). For example, the diameter of the base of the cone 78 is equal to the diameter of the hub 78 in some embodiments. In another example, the cone 78 height exceeds the length of the intake 12 and protrudes therefrom. In yet another example, the cone 78 height is 1 meter and the base diameter for the cone 78 is 2 centimeters.

FIGS. 2 and 3 thus provides a better view of the outside of the inventive wind turbine 10 in terms of the hyperbolic shapes of the air intake 12 (FIG. 2) and the exhaust portion 24 (FIG. 3), as well as the presence and configuration of the slits 14, 16, 18. If desired, again, as noted above, the plurality of slits 14, 16, 18, may be adjustable as well to allow for increased back pressure to occur within the turbine upon exposure to excessively high wind speeds. Basically, although the inventive device primarily allows for the generation of wind speed increases and thus the capability of increasing turbine effectiveness at low-wind sites, as well, such a device may compensate for unexpectedly high wind speeds through the closure of the slits 14, 16, 18 upon demand, or upon sensing thereof by computer (for example). Those of skill in the art will recognize that there are many ways to provide for adjustable slits 14, 16, 18. For example, spring loaded covers which are manually or automatically deployed to close the slits 14, 16, 18, at least partially are utilized in one embodiment. Thus, great versatility in utilization capability is accorded the user through such heretofore unavailable modifications and designs within the wind turbine art.

FIG. 4 thus shows a partial cross-section of the overall device with the properly shaped air intake 12, the slits 14, 16, 18, and the exhaust portion 24 in place. The throat 20 is intermediate the air intake 12 and exhaust portion 24. Within the throat 20 is present the aforementioned turbine 70 with an optional cone 78 (to act, again, as a proper wind diverter) attached to posts 92 (within the throat 20 and prior to the turbine 70) through a plurality of bolts (86, 88) (although two are shown, any number may be utilized for securing the cone 78 to the posts 92). An inverted cone 90 is optionally present subsequent to the turbine 70 (and also attached to the posts 92) as well to allow for even wind distribution into the exhaust portion 24 if desired. The turbine 70 is thus in contact with an electrical generator 80 (for example a dynamo or alternator). An additional benefit of the slits 14, 16, 18 is that they actually provide cooling capability around the throat 20 thus potentially cooling the electrical generator 80 during use if needed. The electrical generator 80 is thus connected to either an electrical transfer or storage device (not illustrated) to impart the generated electric charges in such a fashion during use.

The following is an example embodiment of the device 10 with a 1.55 m length for the overall device 10 (as merely a potentially preferred measurement; again, the ratios of diameters of the curved portions and the throat are the more important issue in terms of viability and utilization as the entire device 10 is scalable in such a situation), the following table provides the measured diameters of the portions of the device 10 for this example embodiment.

TABLE 2

EXAMPLE

| Distance from air intake inlet (m) | Diameter (m) | |
|---|---|---|
| 0 | 0.752 | |
| 0.05 | 0.676 | |
| 0.1 | 0.612 | |
| 0.015 | 0.558 | |
| 0.2 | 0.51 | |
| 0.25 | 0.468 | |
| 0.3 | 0.43 | Intake |
| 0.35 | 0.395 | |
| 0.4 | 0.364 | |
| 0.45 | 0.336 | |
| 0.5 | 0.31 | |
| 0.55 | 0.288 | |
| 0.6 | 0.267 | |
| 0.65 | 0.25 | |
| 0.7 | 0.25 | |
| 0.75 | 0.25 | |
| 0.8 | 0.25 | |
| 0.85 | 0.25 | Throat |
| 0.9 | 0.25 | |
| 0.95 | 0.25 | |
| 0.99 | 0.25 | |
| 1.03 | 0.251 | |
| 1.07 | 0.256 | |
| 1.11 | 0.263 | |
| 1.15 | 0.272 | |
| 1.19 | 0.283 | |
| 1.23 | 0.297 | Exhaust |
| 1.27 | 0.313 | |
| 1.31 | 0.331 | |
| 1.35 | 0.352 | |
| 1.39 | 0.376 | |
| 1.43 | 0.404 | |
| 1.47 | 0.439 | |
| 1.51 | 0.483 | |
| 1.55 | 0.55 | |

Thus, the curves of the air intake 12 and the exhaust portion 24 differ in this manner with a static measurement for the throat portion 20.

FIG. 5 provides a cross-sectional view of the internal throat portion 20 showing the cone 78 (again, an optional component) the posts 92 (optional, as well, depending on the desired presence of the air diverting cone 78) and the turbine 70 with its individual blades 72.

Taken together, the inventive wind turbine device 10 functions as follows: wind is captured within the air intake 12. Some wind is directed outward through the slits 14, 16, 18 and the remainder of the wind is directed through the throat 20 whereupon the turbine 70 is contacted by an air stream with an increased speed at its individual blades 72, thereby rotating the turbine 70 and which rotates the electrical generator 80 to create electrical charges. The wind passes through the turbine 70 and out the exhaust portion 24 thereby dissipating outwardly from the entire device 10.

As illustrated in FIG. 6, there are three primary regions of air flow in the device 10. The first region of air flow 100 is a slow moving boundary layer against the curved interior surface 3 of the air intake 12. The second region of air flow 200 is the air ejected from the device through the slits (14, 16, 18) which is described in more detail below. The third region of air flow 300 consists of the bulk of the air flow through the center of the device 10. The third region is approximately the diameter of the throat 20 and comprises air which is accelerated into the throat 20 and provides a key advantage of this device 10 for electricity generation.

The narrowing of the air intake 12 to the throat 20 creates a flow constriction, and hence back pressure. The plurality of slits (14, 16, 18) permit some air to flow out (200) from the intake 12 of the device 10, thereby relieving a backup of the second region of air flow 200. The opening of the slits (14, 16, 18) are oriented parallel to the second region of air flow 200, which allows some of the air to flow straight out of the intake 12 along its natural path (200), preventing turbulence that would occur if the second region of air flow 200 collided with an interior wall of the air intake 12 at some angle to the second region of flow 200. This allows for increased speed of the third region of air flow 300 into the throat 20 of the device 10 due to conservation of momentum and the Venturi effect. Newton's third law is also in effect, where the air is pushed out of the slits (14, 16, 18) by the third region of air flow 300 in the center of the intake 12. Little turbulence is seen outside the slits (14, 16, 18), which helps mitigate turbulence in the intake 12.

As noted above, this method has been shown to provide a factored increase of about 2 to 2.5 in terms of wind speed measured external the air intake as compared to wind speed within the throat. Such an increase can permit the location of such a device in a lower class wind environment in order to generate wind power density results at a higher class rate (such as, for instance, a device present in a Class 1 location resulting in power generation relative to a Class 3 location, simply through the design of and modifications present within the inventive device itself) (the Class descriptions are provided within the Standards Table (Table 1), supra).

While the preferred embodiment and best mode of the present invention have been described herein in order to illustrate the principles and applications thereof, it is understood that various modifications or alterations may be made to the present invention without departing from the true scope of the invention set forth in the appended claims.

What is claimed is:

1. A wind turbine device for increasing ambient wind speed comprising:
    an air intake for channeling wind into the turbine device having an intake inlet, an intake outlet and a first curved interior surface of the intake for increasing wind speed as wind travels through the turbine device, the intake substantially symmetrical about its axis and exhibiting a maximum diameter at the intake inlet and a minimum diameter at the intake outlet;
    an exhaust portion adjacent to the intake and axially aligned therewith for dissipation of the wind exiting the wind turbine device, the exhaust having an exhaust inlet, an exhaust outlet and a second curved interior surface of the exhaust portion for relieving back pressure in the throat, the exhaust substantially symmetrical about its axis and exhibiting a minimum diameter at the exhaust inlet and a maximum diameter at the exhaust outlet;
    a substantially cylindrical throat connecting the intake and the exhaust portion and axially aligned therewith such that wind entering the device at the air intake inlet experiences an increase in wind speed between the intake inlet and the throat;
    a turbine, freely rotatable about its axis positioned within and axially aligned with the throat such that wind traveling through the device contacts the turbine creating turbine axial rotation thereby converting wind energy to mechanical energy; and
    an electrical generator mechanically connected to the turbine and attached to said throat such that rotation of the turbine drives the electrical generator thereby converting mechanical energy to electrical energy;
    wherein said turbine and said electrical generator are axially aligned and housed within said throat;
    wherein said device has a linear distance between the intake inlet and exhaust outlet X;
    wherein said first interior curved surface of the intake exhibits a hyperbolic curve design whereby the hyperbolic curve is defined by the equation $[0.43\,(1-\exp(-0.07-2.58*(X))]$; and
    wherein said turbine is located nearer said air intake than said electrical generator.

2. The wind turbine device of claim 1 further comprising:
    a central hub of the turbine axially aligned with the throat and freely rotatable about its axis;
    a plurality of blades extending radially from the hub; and
    a cone attached to the hub extending into the intake for directing wind traveling through the wind turbine device to a specific location on the blades thereby increasing the torque applied to the blades.

3. The wind turbine device of claim 2 wherein:
    the cone has a base diameter which is substantially equal to a turbine hub diameter.

4. The wind turbine device of claim 1 wherein:
    the throat has a constant diameter;
    a ratio of the intake inlet diameter to the throat diameter ranges from between about 2.5 to 1 to about 4 to 1;
    a ratio of the intake inlet diameter to the exhaust outlet diameter is about 1.4 to 1; and
    a ratio of the exhaust outlet diameter to the throat diameter is about 2.3 to 1.

5. The wind turbine device of claim 1 wherein:
    the device has a linear distance between the intake inlet and exhaust outlet X; and
    the second interior curved surface of the exhaust exhibits a parabolic curve design whereby the parabolic curve is defined by the quadratic equation $[1.075*X^2-0.115X+0.257]$.

6. The wind turbine device of claim 1 further comprising:
    an inverted cone positioned centrally within the exhaust adjacent the exhaust inlet and axially aligned with the exhaust for evenly distributing the wind exiting the throat.

7. A wind turbine device for increasing ambient wind speed comprising:
    an air intake for channeling wind into the turbine device having an intake inlet, an intake outlet and a first curved interior surface of the intake for increasing wind speed as wind travels through the turbine device, the intake substantially symmetrical about its axis and exhibiting a maximum diameter at the intake inlet and a minimum diameter at the intake outlet;
    an exhaust portion adjacent to the intake and axially aligned therewith for dissipation of the wind exiting the wind turbine device, the exhaust having an exhaust inlet, an exhaust outlet and a second curved interior surface of the exhaust portion for relieving back pressure in the throat, the exhaust substantially symmetrical about its axis and exhibiting a minimum diameter at the exhaust inlet and a maximum diameter at the exhaust outlet;

a substantially cylindrical throat connecting the intake and the exhaust portion and axially aligned therewith such that wind entering the device at the air intake inlet experiences an increase in wind speed between the intake inlet and the throat;

a turbine, freely rotatable about its axis positioned within and axially aligned with the throat such that wind traveling through the device contacts the turbine creating turbine axial rotation thereby converting wind energy to mechanical energy; and an electrical generator mechanically connected to the turbine such that rotation of the turbine drives the electrical generator thereby converting mechanical energy to electrical energy;

wherein said air intake includes a plurality of annular slits concentrically positioned about the circumference of said air intake allowing for discharge of a portion of the wind from the intake thereby reducing backpressure in the intake and increasing wind speed through the device.

8. The wind turbine device of claim 7 further comprising:
a plurality of slit covers for adjusting the size of said slits to control wind speed through the device.

9. The wind turbine device of claim 7 wherein:
each of the plurality of slits has a width that ranges from about 1 centimeter to about 8 centimeters.

10. The wind turbine device of claim 7 wherein:
a wind speed measured at the throat is between about 2 and 2.5 times greater than a wind speed measured at the intake inlet.

11. A wind turbine device for increasing ambient wind speed comprising:
an air intake for directing wind through the device having a first curved interior surface for increasing wind speed and at least one annular slit about the circumference of the intake for discharging a portion of wind from the intake thereby relieving backpressure on the intake, wherein said at least one slit is attached to said air intake through a plurality of coupling portions;

a substantially cylindrical throat connected to the air intake enclosing a turbine capable of axial rotation and axially aligned with the throat such that wind moving through the throat contacts the turbine causing turbine rotation thus converting wind energy to mechanical energy;

an electrical generator connected to the turbine for converting wind energy into electricity upon rotation of the turbine; and an exhaust portion connected to the throat having a second curved interior surface for reducing backpressure on the throat and discharging wind from the device.

12. The wind turbine device of claim 11 further comprising:
a cone attached to the turbine and axially aligned therewith extending into the intake for directing wind traveling through the wind turbine device to a specific location on the turbine thereby increasing the torque applied to the turbine.

13. The wind turbine device of claim 11 further comprising:
an inverted cone positioned centrally within the exhaust adjacent the exhaust inlet and axially aligned with the exhaust for evenly distributing wind exiting the throat.

14. The wind turbine device of claim 11 further comprising:
at least one slit cover for adjusting the size of the at least one slit to control wind speed through the device.

15. The wind turbine device of claim 11 wherein:
the first interior curved surface exhibits a hyperbolic curve design; and
the second interior curved surface exhibits a parabolic curve design.

16. The wind turbine device of claim 11 wherein:
the air intake has a volume that is greater than a volume exhibited by the exhaust portion;
the throat has a volume that is less than the air intake volume; and
the exhaust portion volume is greater than the throat volume.

17. The wind turbine device of claim 11 wherein:
the throat has a constant throat diameter;
the air intake has a maximum diameter at an inlet to the air intake and a minimum diameter equal to the throat diameter at a throat inlet; and
the exhaust portion has a maximum diameter at an outlet to the exhaust portion and a minimum diameter equal to the throat diameter at a throat outlet.

18. A method of generating electricity using the wind turbine device of claim 7, said method comprising the steps of:
channeling wind into said air intake of the wind turbine device;
accelerating the wind speed in a central column of wind passing through the device by passing the wind over the curved interior surface of the air intake;
discharging a portion of wind from the air intake through said annular slits in the intake thereby reducing back pressure in the intake;
using the accelerated wind to generate mechanical energy; and
converting the mechanical energy to electricity.

19. The method of claim 18 further comprising the steps of:
adjusting the amount of wind discharged through the annular slits thereby controlling the wind speed through the device.

20. A wind turbine device for increasing ambient wind speed comprising:
an air intake for channeling wind into the turbine device having an intake inlet, an intake outlet and a first curved interior surface of the intake for increasing wind speed as wind travels through the turbine device, the intake substantially symmetrical about its axis and exhibiting a maximum diameter at the intake inlet and a minimum diameter at the intake outlet;

an exhaust portion adjacent to the intake and axially aligned therewith for dissipation of the wind exiting the wind turbine device, the exhaust having an exhaust inlet, an exhaust outlet and a second curved interior surface of the exhaust portion for relieving back pressure in the throat, the exhaust substantially symmetrical about its axis and exhibiting a minimum diameter at the exhaust inlet and a maximum diameter at the exhaust outlet;

a substantially cylindrical throat connecting the intake and the exhaust portion and axially aligned therewith such that wind entering the device at the air intake inlet experiences an increase in wind speed between the intake inlet and the throat;

a turbine, freely rotatable about its axis positioned within and axially aligned with the throat such that wind traveling through the device contacts the turbine creating turbine axial rotation thereby converting wind energy to mechanical energy; and an electrical generator mechanically connected to the turbine and attached to said throat such that rotation of the turbine drives the electrical generator thereby converting mechanical energy to electrical energy;

wherein said turbine and said electrical generator are axially aligned and housed within said throat;

wherein said device has a linear distance between the intake inlet and exhaust outlet X;

the second interior curved surface of the exhaust exhibits a parabolic curve design whereby the parabolic curve is defined by the quadratic equation [$1.075*X2-0.115X+0.257$]; and wherein said turbine is located nearer said air intake than said electrical generator.

* * * * *